INVENTOR
William T. Immenschuh

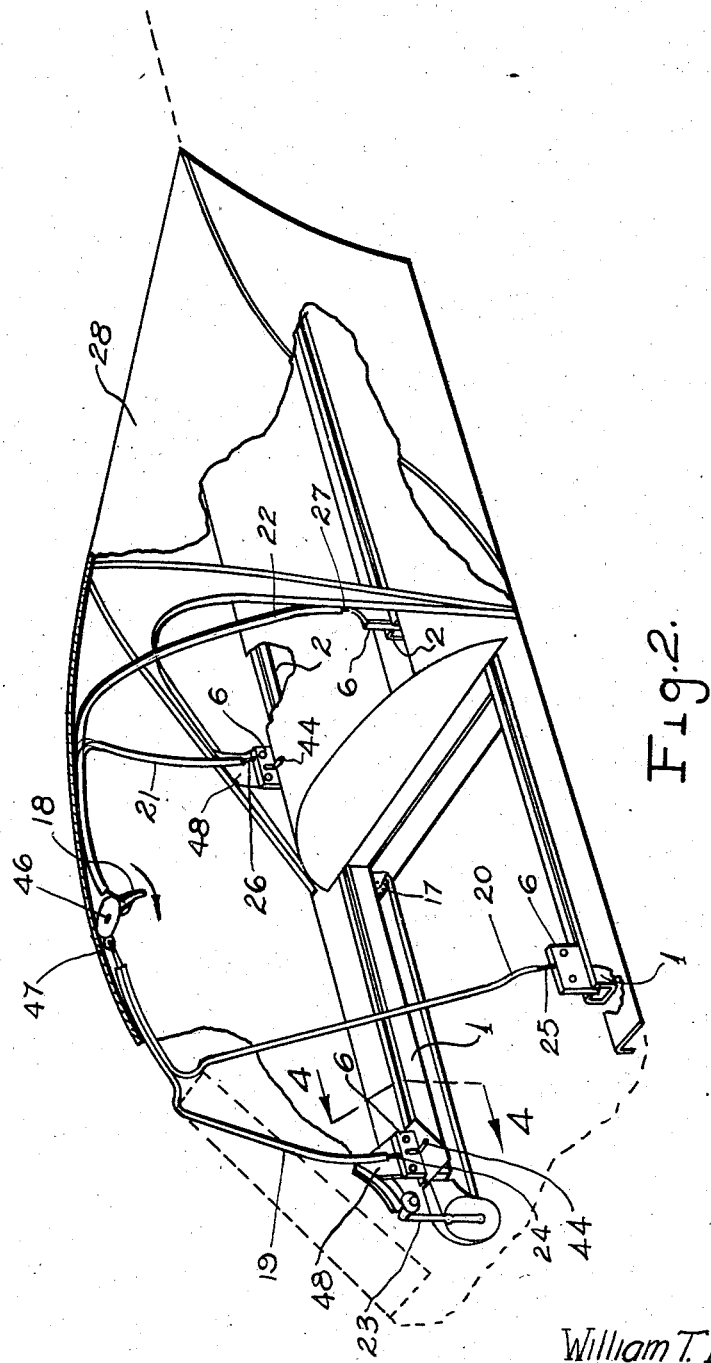

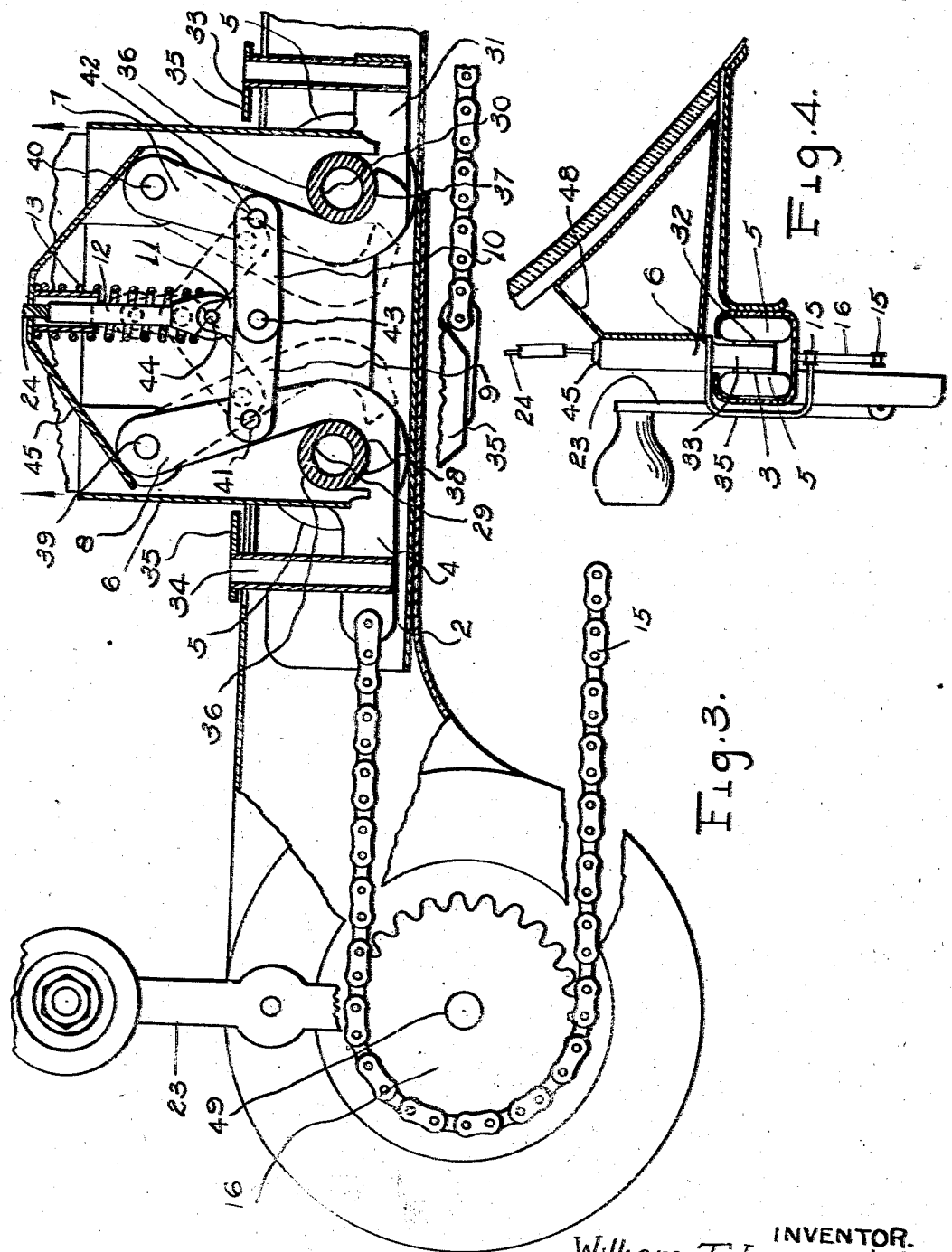

Patented May 28, 1946

2,401,076

UNITED STATES PATENT OFFICE 2,401,076

COCKPIT ENCLOSURE RELEASING MECHANISM

William T. Immenschuh, La Mesa, Calif., assignor to The Ryan Aeronautical Co., San Diego, Calif., a corporation of California Application February 19, 1945, Serial No. 578,569

2 Claims. (Cl. 244—121)

This invention relates to a cockpit enclosure releasing mechanism, more particularly for use in connection with fighter airplanes.

This cockpit enclosure releasing mechanism is especially useful in case of emergency for removing the canopy over the pilot's cockpit, permitting the pilot to escape from a crippled or inoperative airplane. A particular advantage in the operation of this cockpit enclosure releasing mechanism is the combination of releasing mechanism in connection with the canopy supporting carriers whereby the canopy is manually released from the carriers permitting the airload on the canopy to carry the canopy clear of the pocket so that the pilot is free to escape from the airplane.

The combination of the releasing mechanism with the canopy supporting carriers provides a very simple arrangement which is positive in operation either in supporting or releasing the canopy. Fairleads in connection with the carriers and releasing mechanism converge to a common mechanical control providing simplicity in the releasing operation of the canopy during an emergency when the pilot may be hurried in his attempt to escape from the airplane.

The complete removal of the canopy by the airload provides ample clearance for the pilot to escape from the airplane. This canopy enclosure releasing mechanism is also combined in a very simple relationship with the enclosure travel actuating mechanism providing a very light and compact canopy operating structure.

Referring to the accompanying drawings:

Fig. 2 is a perspective view of the cockpit enclosure canopy showing the cockpit enclosure releasing mechanism in connection therewith, and also showing portions of the canopy broken away to amplify the illustration.

Fig. 3 is an enlarged longitudinal sectional view of the cockpit enclosure releasing mechanism in connection with the track and propelling mechanism, and Fig. 4 is an enlarged fragmentary sectional view taken from the line 4—4 of Fig. 2.

Similar characters of reference refer to similar parts and portions throughout the several views of the drawings.

Figure 1:
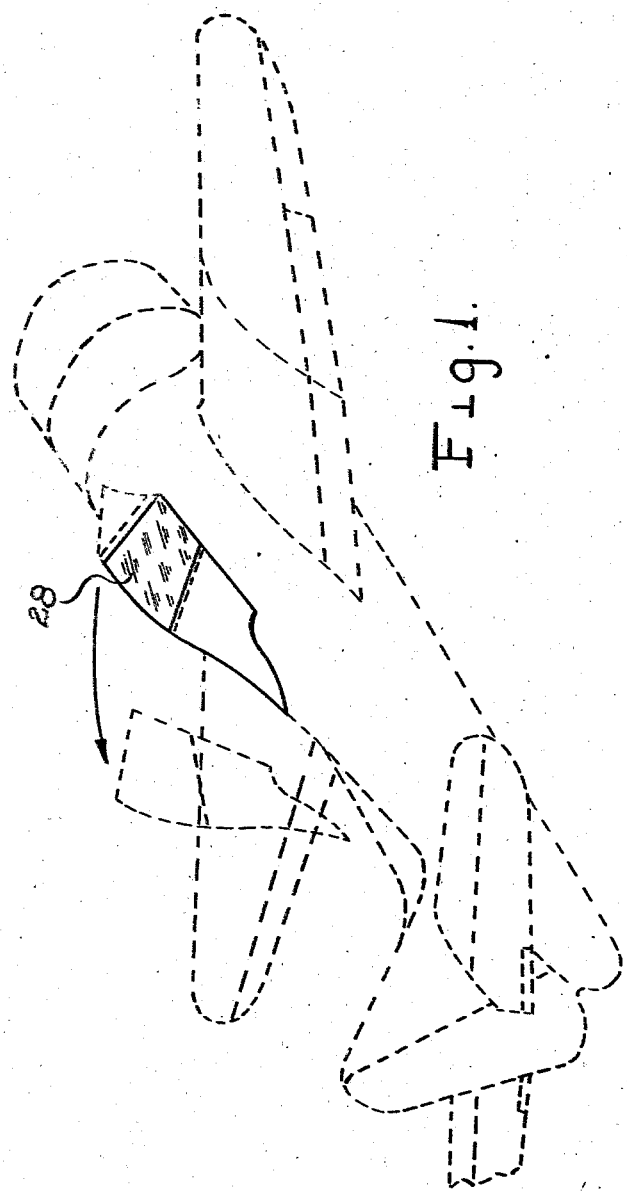
Fig. 1 is a perspective view of an airplane, showing in solid line the canopy thereof in position and in dotted line showing the canopy in carried away position.

The tracks 1 and 2, carriers 4, carrier wheels 5, latch casings 6, latch members 7 and 8, toggle members 9 and 10, clevis 11, cable eye member 12, spring 13, spring holder 14, chain 15, sprockets 16 and 17, handle 18, fairleads 19, 20, 21 and 22, operating lever 23, cables 24, 25, 26 and 27, and the canopy 28 constitute the principal and operating parts of the cockpit enclosure releasing mechanism.

The tracks 1 are positioned at opposite sides of the airplane cockpit and extend longitudinally thereof, as shown best in Fig. 2 of the drawings. The carriers 4 travel back and forth in the tracks 1 and 2 in connection with the latch casings 6, as shown best in Fig. 3 of the drawings. These carriers 4 are each provided with four carrier wheels 49 mounted on axles 29 and 30 and are supported in connection with the carriers 4 at opposite sides of the latch casing 6 as shown in Fig. 4 of the drawings, the carrier 4 as shown in Fig. 3 of the drawings is provided with a pair of longitudinally extended frame portions 31 and 32 welded to which are tubular members 33 and 34 which support the propelling arm 35 connected to the chain 15, which passes over the sprockets 16 and 17.

It will be here noted that one end of the chain 15 is secured to the propelling arm 35, the opposite end of the chain 15 is secured between the frame members 31 and 32 of the carrier 4, all as shown best in Fig. 3 of the drawings.

It will be here noted that the latch casings 6 in connection with each of the carriers 4 are substantially identical in construction; however, the carrier 4 in connection with the chain 15 is provided with the additional propelling arm 35 not a part of the remaining carriers 4.

The tracks 2 are arranged in parallel alignment with the tracks 1 at the rear of the cockpit, slightly above the tracks 1 and support carriers 4 together with the rear portions of the canopy 28 as shown best in Fig 2 of the drawings.

As shown best in Fig. 3 of the drawings, the latch casing 6 is substantially box-like in form and is positioned intermediate the frame members 31 and 32 of the carriers 4. The opposite sides of this casing 6 are provided with notched portions 36 arranged to conform with the axles 29 and 30. Pivotally mounted in connection with this latch casing 6 are the latch members 7 and 8 which are provided with hook portions 37 and 38 respectively engaging in lower sides of the axles 30 and 29 respectively, intermediate the pins 39 and 40 on which the latch members 8 and 7 are mounted and the axles 29 and 30 are pivotally connected with the toggle members 9 and 10 by means of the pins 41 and 42. These toggle members 9 and 10 are pivotally connected together at their opposite ends by the pin 43, which extends through the clevis 11 connected to the cable eye member 12 by the pin 44. Secured in connection with the latch casing 6 on the pins 39 and 40 is a spring halter 45 which retains the compression spring 13 in engagement with the cable eye member 12 for holding the toggle members 9 and 10 in over-center position maintaining the latch members 7 and 8 in engagement with the axles 29 and 30.

The cables 24, 25, 26 and 27 are supported and guided by the fairleads 19, 20, 21 and 22, which converge at the upper side of the canopy 28 guiding the cables 24, 25, 26 and 27 to the common control handle 18, which is pivotally mounted in connection with the canopy 28 on the bolt 46.

It will be noted that the control cables 24 and 25 are secured on the end portion 47 of the control handle 18, while the control cables 26 and 27 are secured to the control handle 18 at the opposite side thereof from the pivotal axis of the bolt 46 providing synchronous operation of the control cables 24, 25, 26 and 27 when the control handle 18 is pivoted as indicated by the arrow in Fig. 2 of the drawings.

As shown in Fig. 3 of the drawings, the toggle members 9 and 10, together with the latch members 7 and 8 are shifted into the dash line position when the control cable 24 is pulled through the fairlead 19 by means of the control handle 18 when pivotally shifted as indicated by the arrow in Fig. 2 of the drawings. In this manner the latch members 7 and 8 are released from engagement with the axles 29 and 30 permitting the latch casing 6 to be freely removed from the carrier 4, as shown in Fig. 3 of the drawings, as desired.

Each of the casings 6 is secured in connection with the canopy 28 by brackets 48.

The operation of this cockpit enclosure releasing mechanism is substantially as follows: When the pilot of an airplane to which the cockpit enclosure releasing mechanism is connected is flying an airplane with the canopy 28 in closed position, he may remove the canopy from its position over the cockpit by shifting the control handle 18 in the direction as indicated in the arrow on Fig. 2 of the drawings. When this control handle 18 is shifted, the control cables 24, 25, 26 and 27 are drawn through the fairleads 19, 20, 21 and 22 shifting the toggle members 9 and 10 together with the latch members 7 and 8 in each of the latch casings 6 disengaging the latch members 7 and 8 from connection with the axles 29 and 30 in each of the carriers 4 permitting the airload upon the canopy to carry the canopy away uncovering the cockpit as shown in Fig. 1 of the drawings so that the pilot may escape from the airplane.

When it is desired to open and close the canopy 28 by shifting it backward or forward respectively, the lever 23 is rotated about the axis of the bolt 49, rotating the sprocket 16 together with the sprocket 17 in engagement with the chain 15. This chain 15 at its opposite ends is connected to the carrier 4 as hereinbefore described and is arranged to propel the canopy 28 on the roller 49 in connection with each of the carriers 4 in the tracks 1 and 2.

It will be here noted that the pin 44 extending through the clevis 11 is extended inwardly as shown best in Fig. 2 of the drawings. These pins 44 extend from each of the casings 6 and are provided for use in manual releasing of the toggle members 9 and 10 if connecting cables should fail or be damaged.

Other embodiments of the invention employing the same or equivalent principle may be used and structural changes made as desired by those skilled in the art without departing from the present invention, and within the spirit of the appended claims.

Having thus described my invention what I claim as new and desire to secure by Letters Patent is:

1. In a cockpit enclosure releasing mechanism for airplanes, a canopy, a pair of longitudinally disposed tracks at opposite sides of said cockpit, carriers arranged to traverse said tracks and latch means in connection with said canopy engageable with said carriers, each of said carriers provided with rollers and axles therefor; said latch means in connection with said canopy engageable with said axles, over center toggle means connected with said latch means for operatively engaging and disengaging said latch means with said axles.

2. In a cockpit enclosure releasing mechanism for airplanes, a canopy, a pair of longitudinally disposed tracks at opposite sides of said cockpit, carriers arranged to traverse said tracks and latch means in connection with said canopy engageable with said carriers, each of said carriers provided with rollers and axles therefor; said latch means in connection with said canopy engageable with said axles, over center toggle means connected with said latch means for operatively engaging and disengaging said latch means with said axles, cables in connection with said toggle members, extending to the upper portion of said canopy and a control handle connected with said cables arranged to operate said latch means.

WILLIAM T. IMMENSCHUH.